Dec. 11, 1973     J. L. HELSER     3,778,494
SLAKING QUICKLIME IN AQUEOUS SODIUM/POTASSIUM SILICATE
SOLUTION IN MANUFACTURE OF HYDROUS
CALCIUM SILICATE PRODUCTS
Original Filed April 28, 1969
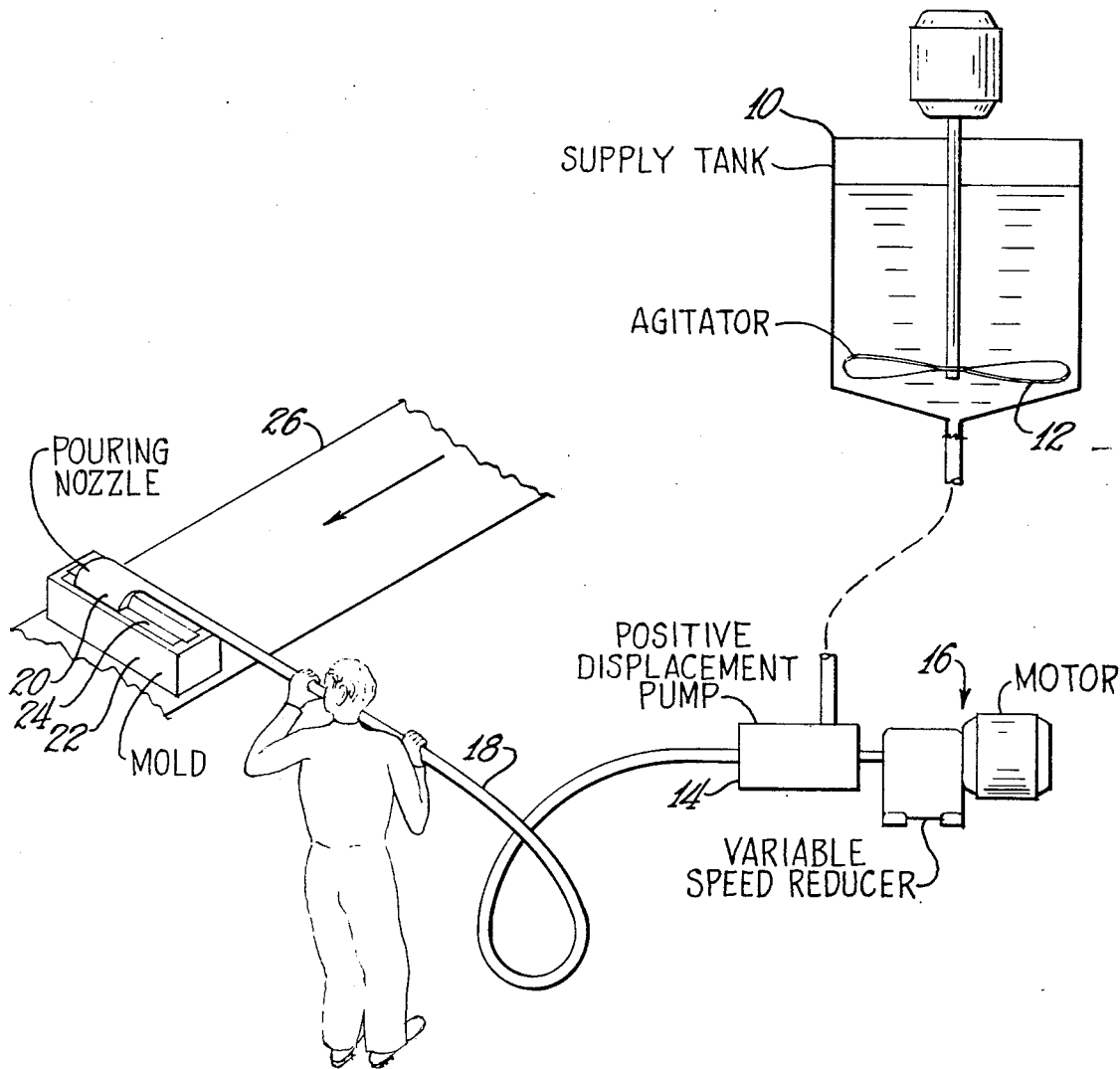
INVENTOR.
JERRY L. HELSER
BY
Staelin & Overman
ATTORNEYS

United States Patent Office 3,778,494
Patented Dec. 11, 1973

---

3,778,494
SLAKING QUICKLIME IN AQUEOUS SODIUM/ POTASSIUM SILICATE SOLUTION IN MANUFACTURE OF HYDROUS CALCIUM SILICATE PRODUCTS
Jerry L. Helser, Hebron, Ohio, assignor to Owens-Corning Fiberglas Corporation
Continuation of abandoned application Ser. No. 819,593, Apr. 28, 1969. This application Aug. 18, 1971, Ser. No. 172,882
Int. Cl. C04b 1/06, 15/12, 31/08
U.S. Cl. 264—82                                                4 Claims

ABSTRACT OF THE DISCLOSURE

In the manufacture of hydrous calcium silicate thermal insulation products containing fiber reinforcement "voids" and "fold planes" in the final product are a frequent problem. These problems are abated by slaking the quicklime in water containing dissolved sodium or potassium silicate in prescribed amounts. The dissolved silicate forms a coating on the particles of calcium hydroxide that acts as a barrier and retards further and continued hydration. Later the other conventional ingredients are added, the resultant slurry is poured into molds of desired shape, the filled molds are heated with steam to preharden the slurry and finally the filled molds are autoclaved to harden and dry the molded products.

---

This application is a continuation of Ser. No. 819,593, filed Apr. 28, 1969, and now abandoned.

BACKGROUND OF THE INVENTION

In one commercial process of producing hydrous calcium silicate thermal insulation material, calcium hydroxide is reacted with siliceous materials, as for example sand, or other crystalline forms of $SiO_2$ including reacted silicates, as for example dicalcium silicate and tricalcium silicate to produce a tobermorite or xonotlite crystalline phase which bonds the fillers and fibers together. The calcium hydroxide may be obtained from quicklime, hydrated lime, or from partially reacted calcium materials, as for example, dicalcium and tricalcium silicates. In one of the commercial processes for producing such insulation material, a slurry is produced of the calcareous material, siliceous material, and fillers, and this slurry is poured into molds which are then heated in the presence of steam to a temperature above approximately 160° F. to cause the slurry to thicken or gel, following which the gelled material is placed in an autoclave where it is indurated with steam at pressures above 100 pounds per square inch. One of the principal uses of the insulation materials is as a pipe insulation, in which case the material must be made in approximately three foot lengths having a cross section that is hemiannular. The pipe insulation is produced in molds having a cavity which is hemiannular in shape, and these cavities are filled from a pouring nozzle that is put into one side of the hemiannular cavity and moved lengthwise of the opening. In the 50 years in which the process has been used to produce molded pipe insulation, it has been the experience that less than 90% of the pieces of insulation which have been produced were usable because of "voids" and "fold planes" in the finished pieces of insulation. "Voids" occur when the molds are not completely filled with the slurry, and "fold planes" occur when slurry is added on top of other slurry without flowing together. While the art has long desired to prevent the production of over 10% of product which cannot be used, it has not known why "fold planes" remain in some instances and not in others, nor what could be done to eliminate "voids" and "fold planes."

An object of the present invention is the provision of a new and improved method of molding hydrous calcium silicate forming slurries which substantially eliminates the formation of "voids" and "fold planes."

Further objects and advantages of the invention will become apparent to those skilled in the art to which the invention relates from a reading of the following description of applicant's preferred embodiments, in conjunction with the accompanying drawing forming a part of the specification.

BRIEF DESCRIPTION OF THE DRAWING

The sole figure of the drawing is a somewhat schematic depiction of the mold, pouring nozzle, positive displacement pump, and variable speed drive therefor that is used in one preferred method of performing the present invention.

DESCRIPTION OF THE PREFERRED EMBODIMENTS

In order to facilitate a full understanding of the principles of the present invention, a description of the preferred method of molding the insulation material shown in the drawing will first be given. In the process depicted in the drawing, a hydrous calcium silicate forming slurry is prepared and held in a tank 10 having an agitator 12 therein which keeps the slurry homogenous. The slurry from the tank 10 flows to a positive displacement pump 14 which in turn is driven by a variable speed drive 16. The effluent from the pump 14 passes through conduit 18 to a pouring nozzle 20, which is used to fill the molds in which the slurry is hardened. Each of the molds 22, only one of which is shown in the drawing, has a mold cavity 24 of a hemiannular cross section for producing pipe insulation. The molds 22 extend crosswise of a conveyor 26 which moves the molds past the operator who controls the pouring nozzle 20. The operator places the pouring nozzle 20 into one side of the hemiannular mold cavity 24 and the velocity of the slurry is utilized to force the slurry to the opposite side of the cavity. The nozzle is moved lengthwise of the cavity to fill all parts of the mold.

According to principles of the present invention it has been discovered that "fold planes" are produced when the consistency of the slurry is not held within a generally narrow and predetermined range. This consistency is such as not to be so thin as to allow a layer of water to form quickly on the surface of the slurry, nor so thick as to prevent globs of the slurry from flowing together to exclude air. It is a discovery of the present invention that "fold planes" can be formed by a thin layer of water on the surface of one body of slurry when it is forced against another body of slurry, even though the layer of water is so thin as to go undetected by the human eye.

According to further aspects of the invention, the possibility of entrapping air between the "folded over" slurry in the molds is reduced to a minimum by causing the pouring nozzle to move across the cavity and then back again with a smooth motion. According to the invention, the nozzle is allowed to rest on the mold adjacent the side of the operator who then pushes it to the opposite side of the mold, pulls it back again to the starting position. To compensate for molds having different size cavities, the nozzle is supplied with slurry by a positive displacement pump whose speed is either increased or decreased in proportion to the thickness of the cavity to be filled, and the number of back and forth strokes is varied in proportion to the pipe size of insulation being produced. The operator, therefore, utilizes the same smooth across and back again motion of the nozzle regardless of the cavity size to be filled. This smooth motion tends to align the fibers in the slurry longitudinally of the cavity, so that the fibers in the slurry laid down from succeeding passes blend together in uninterrupted fashion. Heretofore it was necessary to fill the thickness of a cavity by a delaying action which produced swirls; and this, it is now found, has helped to form fold planes and air pockets. By utilizing a positive displacement pump and varying the speed of its drive in proportion to the thickness of the cavity, the extruded slurry expands uniformly to fill the thickness of the cavity, and the back and forth movement of the nozzle forces layers of slurry together in which the fibers are generally parallel and indistinguishable.

In order that the layers of slurry laid down by uniform back and forth motion will knit together, it is necessary that the batches of slurry fed to the nozzle have substatnially the same generally ideal consistency.

According to further aspects of the invention it has been found, that the ideal consistency for the manner of pouring above described is had by a controlled hydration of quicklime. Powdered hydrated lime cannot be used to give the desired consistency, nor can other forms of CaO with which applicant is aware, as for example portland cement. It has been found that the desired consistency is had when quicklime is slaked with water at a temperature between approximately 65° F. and 80° F., and the quicklime comprises more than approximately 3% of the total weight of the solids. If it is slaked with water having a temperature above approximately 80° F., the consistency of the slaked lime plus the other solids of the slurry is too high for the method of pouring above described. Indications are that when quicklime is reacted with water within the temperature range, that hexagonal platelets of $Ca(OH)_2$ are produced of a controlled multimolecular size, and that these crystalline platelets carry a charge which suspends the platelets by reason of Brownian movement. At water temperatures above 80° F., a more violent reaction with the water occurs which produces smaller platelets causing too high a consistency. According to still further aspects of the invention, it has been found, that the desired consistency can be had using more than approximately 3% quicklime based on the total solids of the batch, and water above 80° F., provided that the quicklime is added to a greater than 0.33% solution of sodium silicate, or potassium silicate. It appears that when the quicklime is dissolved in the presence of a dissolved silicate, only a partial solubilizing of the quicklime is produced, and that a film of crystalline material is produced around these particles which impedes the complete solubilizing of the CaO. The evidence is that the film is a dicalcium silicate having no more than approximately 1.2 molecules of water per molecule of the dicalcium silicate. There are, of course, competing reactions to produce still other materials, as for example, gels having the formula $2.0CaO.SiO_2.xH_2O$ where $x$ is 2 or more. While the dicalcium silicate gel may help to thicken the material, it is not believed present in sufficient quantities to provide the impediment to the complete solubilizing of the CaO which is apparent.

On a commercial basis, therefore, it is completely feasible to prepare batch after batch of slurry having the desired narrow range of consistency, during both winter and summer, and even though the temperatures and reactivities of the raw materials including the water may vary. When the temperature of the raw materials is less than 80° F., the quicklime is added to either water or water containing the generally inert materials, and after the crystalline $Ca(OH)_2$ material is formed, a sodium silicate solution is added without appreciably affecting the consistency of the batch. When the consistency of the batch becomes too high, however, as for example when the temperature of the material exceeds 80° F., or quicklime is used in an amount above approximately 3% by weight, the quicklime is added to water containing the sodium or potassium silicate. This is conveniently done by blending the ingredients of the slurry with water and sodium silicate and adding the quicklime thereto. Sodium and potassium silicates are believed to contain charged particles of $SiO_4.H_2O$ and these charged particles, being quite reactive, react with the charged particles of $Ca(OH)_2$ to produce what is believed to be a coating of dicalcium silicate crystals surrounding the particles of $Ca(OH)_2$ to act as a barrier which retards further and continued hydration. Dried hydrated lime does not have either the same ionic charge or the same small particle size necessary for reaction with a silicate solution to produce the dicalcium silicate crystals.

Although the principles of the present invention are not limited to the slurries which are used to produce insulation materials, insulation materials having a tobermorite structure that is preferred for various reasons can be produced from the following range of materials:

| | |
|---|---|
| Quicklime | 2–30 |
| Silica | 4–25 |
| Portland cement | 5–40 |
| Inorganic fibers | 1–25 |
| Fillers | 0–50 |

At temperatures below approximately 80° F., the sodium or potassium silicate need not be used for quicklime batches of less than approximately 3% by weight of total solids; and if used, should be added after the quicklime is added to the water. At temperatures above approximately 80° F., the silicate must be used, and the qiucklime is added to the silicate solution. In the later case, the silicate solution should be present in an amount to provide a dissolved sodium or potassium silicate to quicklime ratio of from 1/80 to 1/2.5. In order that the strength of the finished product will not be reduced below an acceptable level, the $Na_2O$ or $K_2O$ content must be below 3.0% by weight of total batch solids, and is preferably below 1.5%.

Example 1

A preferred formulation of slurry having a 6 to 1 water to solids ratio was made from the following materials in the parts and percentages given below:

| Materials | Parts by weight | Percent solids by weight |
|---|---|---|
| Asbestos fibers | 400 | 12.8 |
| Quicklime | 480 | 15.4 |
| Granulated silica | 200 | 6.4 |
| Diatomaceous earth | 672 | 21.5 |
| Clay | 100 | 3.2 |
| Fillers | 605 | 19.4 |
| Portland cement | 564 | 18.1 |
| Liquid soldium silicate (3.25 $SiO_2$/$Na_2O$–40% solids) | 250 | 3.2 |
| Total solids | 3,121 | 100.0 |

One fourth of the water was placed in a tank equipped with an agitator, and the heat equalized temperature was determined to be 80° F. The quicklime was then added and mixed for 4 minutes. This material was then pumped to a larger mixing tank where the balance of the water was added. The balance of the dry materials was then slowly added with agitation. The temperature of this mixture was approximately 80° F. The liquid sodium silicate was then added, and the consistency was determined to be 210 grams as determined by the following test.

A brass cone 2¼ inches high which has an apex whose included angle is 45 degrees, is provided with a lead screw that is rotated at 45 r.p.m., and is designed to drive the cone downwardly at a rate of 6 inches in 70 seconds. The cone and its drive mechanism are counterbalanced, and a scale is attached thereto for measuring the force in grams that is required to drive the cone downwardly into a slurry. Sufficient tare is added to offset the buoyancy of the cone in water. A sample of the slurry to be tested is placed in a beaker beneath the cone. The apex of the cone is brought down upon the top surface of the slurry and the force in grams necessary to drive the cone beneath the surface of the slurry is determined. It has been determined that a consistency between approximately 180 grams and 220 grams is required for the above described pouring process.

The above described slurry was pumped by a positive displacement pump driven at 315 r.p.m. to a pouring nozzle used to fill molds for making a 3 inch pipe insulation having an insulation thickness of 1½ inches. The operator placed the nozzle into one side of the mold cavity adjacent one end of the mold, and moved the nozzle to the opposite side and back again with a smooth uniform motion in approximately 4 seconds. The molds so filled were then moved to a prehardener having a steam filled atmosphere at a temperature of 200° F., where the slurry was allowed to preharden for 2 hours. Thereafter the molds were moved into an autoclave where they were indurated by saturated steam having a pressure of 150 pounds per square inch for 2 hours, following which the temperature was raised in the autoclave to 500 degrees while holding the pressure constant to dry excess moisture from the material. The pressure in the autoclave was then dropped to atmospheric during a ½ hour interval, and the molds were removed from the autoclave and cooled to atmospheric temperature. The product stripped from these molds was substantially devoid of air inclusions and pouring folds, so that the efficiency of the pouring operation was 100%.

Example 2

The process of Example 1 was repeated excepting that the slurry was used to fill molds for 2 inch thick 3 inch pipe insulation. The speed of the pump was changed to 350 r.p.m., and 100% of the product was substantially devoid of air inclusions and fold planes.

Example 3

A slurry having the same composition as that of Example 1 above was prepared excepting that: the water used had a temperature of 95° F., and the order of adding the sodium silicate and quicklime during the mixing operation was reversed, so that the sodium silicate solution was added first and thoroughly mixed therein, followed by the addition of the quicklime. The slurry which was so produced had a consistency of 200 grams, and the 1½ inch thick 3 inch pipe insulation made from the slurry was substantially entirely free of air inclusions and fold planes.

Example 4

A slurry was prepared using the procedure of Example 1 from the following materials:

| Materials | Parts by weight | Percent by weight |
| --- | --- | --- |
| Asbestos | 400 | 12.5 |
| Quicklime | 160 | 5.0 |
| Granulated silica | 140 | 4.4 |
| Diatomaceous earth | 476 | 17.8 |
| Clay | 100 | 3.1 |
| Fillers | 605 | 18.9 |
| Portland cement | 1,126 | 35.2 |
| Sodium silicate | 250 | 3.1 |
| Total solids | 3,209 | 100.0 |

The slurry prepared from the above material using 80° F. water had a consistency of 180 grams, and the 1½ by 3 inch pipe insulation made therefrom, was almost completely free of air inclusions and fold planes.

Example 5

A slurry was made using the procedure of Example 1 from the following materials, excepting that the order in which the quicklime and liquid sodium silicate was added was reversed.

| Materials | Parts by weight | Percent by weight |
| --- | --- | --- |
| Asbestos | 400 | 12.3 |
| Quicklime | 920 | 28.2 |
| Granulated silica | 750 | 23.0 |
| Diatomaceous earth | 384 | 11.8 |
| Clay | 100 | 3.1 |
| Fillers | 605 | 18.5 |
| Liquid sodium silicate | 250 | 3.1 |

In the present example, the liquid sodium silicate was added to half of the water and thoroughly mixed in the hydrapulper for 4 minutes, before the dry quicklime was added thereto followed by the remainder of the ingredients. The temperature of the water was 80° F., and the consistency of the slurry was 200 grams. This material when poured into molds for 1½ inch thick 3 inch pipe insulation, was autoclaved as given in Example 1. The insulation was substantially devoid of air inclusions and fold planes.

Example 6

The process of Example 5 was repeated excepting that liquid potassium silicate was substituted for the liquid sodium silicate and the consistency of the slurry so produced was substantially the same, and the product was substantially devoid of air inclusions and fold planes.

Example 7

The process of Example 1 was repeated excepting that only 1% of liquid sodium silicate was used. This material had a consistency of 220 grams, and the product so produced was substantially devoid of air inclusions and fold planes.

The consistency of the slurries that are formed at temperatures below approximately 120° F. are reduced slightly as the concentration of sodium silicate and/or potassium silicate is increased above 3%, and the strength of the finished insulation is also decreased accordingly.

In order that the insulation material will have sufficient strength to be handled in block form, the liquid sodium silicate or potassium silicate should be held below approximately 10% by weight of total solids.

The total amount of sodium silicate and potassium silicate which is used to control the consistency of the quicklime slurry, can be made quite small by pretreating the quicklime in a solution of the silicate which is only a fraction of the total required water. The concentration of the silicate in the water should generally be above approximately 0.33%, but can be as high as 10%, preferably the concentration is between approximately 1% and 5%, and ideally the concentration is approximately 3%. After the quicklime is slaked in this silicate solution and the inhibiting shell is formed on the particles of quicklime, the slurry can be diluted to solutions having much less than 0.33% of the soluble silicate therein, as occurs when the remainder of the batch material is added thereto. Once the silicate shell is formed on the particles of quicklime, the shell is quite stable, and a change in concentration of the silicate in the surrounding water has little effect. It has also been found that an increase in temperature, only slowly increases the amount of deterioration of the shell until a temperature of approximately 150° F. is reached, at which time the shell deteriorates rather rapidly, and the shell is no longer capable, for practical purposes, of preventing further hydration of the lime. The mechanism above described, therefore, can be used to control the consistency of the batches up until such time as it is desired to preharden the slurries. During prehardening the temperature is raised above approximately 150° F., and preferably above 160° F., to destroy the shells around the quicklime and produce a gelatinous phase having the composition above described. Theorically the amount of sodium and/or potassium silicate required to produce the shells surrounding the quicklime is only one half that of the CaO in the material forming the shells. As a practical matter, it will usually be necessary to use more than 1 part of the soluble silicate to 50 parts of the dry quicklime.

The pouring method described above for producing pipe insulation can also be used to pour flat block insulation. The speed of the positive displacement pump is adjusted generally proportionally to the thickness of the block being formed, and the pouring nozzle is moved back and forth adjacent one side edge of the mold to place one strip of slurry, against a previously poured strip of slurry, and utilizing the energy of the slurry, from the nozzle to knit the strips together and eliminate fold planes.

While the invention has been described in considerable detail, I do not wish to be limited to the particular embodiments shown and described, and it is my intension to cover hereby all novel adaptations, modifications, and arrangements thereof which come within the practice of those skilled in the art to which the invention relates.

I claim:

1. In the method of producing calcium silicate hydrate bonded materials wherein a slurry is made of calcareous reactants containing quicklime in an amount more than approximately 3% based on the weight of the total solids in the slurry, and siliceous reactants that include a material from the group consisting of liquid sodium silicate and liquid potassium silicate, the slurry is poured into molds, and the molds are placed in an autoclave and indurated with steam at a temperature of at least 125° C. to transform materials of the slurry into a calcium silicate hydrate, the improvement comprising: slaking the quicklime in a water solution having at least 0.33% of the dissolved silicate and an amount sufficient to provide a dissolved sodium or potassium silicate to quicklime ratio of from 1/80 to 1/2.5 therein with the solution being at a temperature between 80° F. and 150° F. to form a dispersion of lime particles having a coating on the lime particles which acts as a barrier that retards further and continued hydration, and combining the dispersion with the remainder of the slurry-forming materials and pouring the resulting slurry into the molds before raising the temperature of the slurry above approximately 150° F.

2. The method of claim 1 including the step of: pumping the slurry to a pouring nozzle with a variable speed positive displacement pump, and regulating the speed of the pump in relation to the size of the mold to fill the mold in no more than two traverses of the mold.

3. In the method of slaking quicklime wherein dry quicklime is added to water, the improvement comprising: preparing an aqueous solution containing between 0.33% and 10% by weight of a silicate from the group consisting of sodium silicate and potassium silicate and having a temperature above approximately 80° F., mixing quicklime into the silicate solution, and controlling the mixing conditions so that the temperature of the lime slurry produced does not exceed approximately 150° F., and whereby the slaked particles of lime so produced have a coating thereon which acts as a barrier that retards further and continued hydration.

4. The method of claim 3 wherein the silicate to quicklime ratio is between 1/80 and 1/2.5.

References Cited

UNITED STATES PATENTS

| 1,184,320 | 5/1916 | Carson | 106—118 |
|---|---|---|---|
| 1,554,184 | 9/1925 | Holmes et al. | 106—118 |
| 2,328,573 | 9/1943 | Montgomery et al. | 106—78 |
| 3,523,085 | 8/1970 | Shannon | 252—62 |
| 2,432,981 | 12/1947 | Abrahams et al. | 264—333 |
| 2,900,109 | 8/1959 | Hoopes et al. | 222—1 |
| 2,904,444 | 9/1959 | Hoopes et al. | 264—333 |
| 2,554,934 | 5/1951 | Ayers | 106—120 |
| 3,100,156 | 8/1963 | Kalousek et al. | 106—120 |
| 3,316,116 | 4/1967 | Podschus | 106—120 |
| 3,406,030 | 10/1968 | Perrandin et al. | 106—120 |
| 3,470,005 | 9/1969 | Flachsenberg et al. | 106—120 |
| 3,472,668 | 10/1969 | Pfeifer et al. | 106—120 |
| 3,505,439 | 4/1970 | Moorehead et al. | 106—120 |

FOREIGN PATENTS

| 649,615 | 1/1951 | Great Britain | 106—118 |
|---|---|---|---|
| 1,074,481 | 1/1960 | Germany | 106—118 |
| 654,367 | 6/1951 | Great Britain | 106—120 |

JOHN H. MILLER, Primary Examiner

U.S. Cl. X.R.

106—78, 118, 120; 252—62; 264—333